United States Patent
Colibert et al.

[11] Patent Number: 6,113,125
[45] Date of Patent: Sep. 5, 2000

[54] BALL HITCH COUPLER

[76] Inventors: Floyd A. Colibert, 2995 W. 6620 South, West Jordan, Utah 84084; John D. Clarke, 5352 W. Impressions Way, Kearns, Utah 84118

[21] Appl. No.: 09/006,052

[22] Filed: Jan. 12, 1998

[51] Int. Cl.[7] ................................................. B60D 1/06
[52] U.S. Cl. ................................. 280/511; 280/508
[58] Field of Search ..................... 280/901, 511, 280/512, 513, 504, 508, 425.1

[56] References Cited

U.S. PATENT DOCUMENTS

| | | | |
|---|---|---|---|
| 3,567,253 | 3/1971 | De Puydt et al. | 280/512 |
| 3,600,004 | 8/1971 | Newkirk | 280/406 A |
| 3,633,939 | 1/1972 | Evernham et al. | 280/406 A |
| 3,655,221 | 4/1972 | Warner | 280/490 |
| 3,703,301 | 11/1972 | Randle | 280/438 |
| 3,716,255 | 2/1973 | Morris | 280/491 E |
| 3,741,587 | 6/1973 | Wilaman | 280/406 A |
| 3,756,624 | 9/1973 | Taylor | 280/423 R |
| 3,796,444 | 3/1974 | Hixon | 280/483 |
| 3,797,685 | 3/1974 | Frost | 214/334 |
| 3,811,706 | 5/1974 | Tucker et al. | 280/407 |
| 3,837,675 | 9/1974 | Barnes et al. | 280/423 R |
| 3,840,252 | 10/1974 | Jocoy | 280/415 A |
| 3,843,161 | 10/1974 | Hastings | 280/423 R |
| 3,863,956 | 2/1975 | Khan | 280/483 |
| 3,900,212 | 8/1975 | Ewing | 280/406 A |
| 3,972,541 | 8/1976 | Feterl | 280/423 R |
| 3,990,722 | 11/1976 | Casad et al. | 280/485 |
| 4,088,339 | 5/1978 | Sagebiel | 280/423 R |
| 4,103,928 | 8/1978 | Sheppard, Jr. | 280/490 R |
| 4,119,328 | 10/1978 | Rhodes | 280/415 B |
| 4,157,189 | 6/1979 | Poley | 280/490 R |
| 4,168,082 | 9/1979 | Hendrickson | 280/476 R |
| 4,192,524 | 3/1980 | Twiestmeyer | 280/415 A |
| 4,220,350 | 9/1980 | Hatcher | 280/656 |
| 4,227,713 | 10/1980 | Blodgett, Jr. et al. | 280/434 |
| 4,240,647 | 12/1980 | Lewis | 280/482 |
| 4,253,679 | 3/1981 | Sargent | 280/405 R |
| 4,256,323 | 3/1981 | McBride | 280/423 R |
| 4,272,098 | 6/1981 | Greatbatch | 280/494 |
| 4,361,939 | 12/1982 | Gelula et al. | 24/211 M |
| 4,365,820 | 12/1982 | Rush | 280/411 C |
| 4,398,743 | 8/1983 | Belsky et al. | 280/495 |
| 4,402,523 | 9/1983 | Knowles | 280/446 B |
| 4,420,169 | 12/1983 | Taylor | 280/446 R |
| 4,426,097 | 1/1984 | Livingston | 280/415 A |
| 4,438,944 | 3/1984 | Della-Moretta | 280/460 R |
| 4,443,025 | 4/1984 | Martin et al. | 280/407 |
| 4,560,184 | 12/1985 | Williams, Jr. | 280/478 B |
| 4,606,549 | 8/1986 | Williams, Jr. | 280/478 B |
| 4,613,149 | 9/1986 | Williams, Jr. | 280/508 |
| 4,626,154 | 12/1986 | Hesch et al. | 410/56 |
| 4,657,276 | 4/1987 | Hamerl | 280/512 |
| 4,664,403 | 5/1987 | Livingston | 280/460 R |
| 4,699,395 | 10/1987 | Hale | 280/511 |
| 4,714,264 | 12/1987 | Woestelandt | 280/456 R |
| 4,721,323 | 1/1988 | Czuk et al. | 280/433 |
| 4,738,464 | 4/1988 | Putnam | 280/500 |
| 4,792,151 | 12/1988 | Feld | 280/406 A |

(List continued on next page.)

FOREIGN PATENT DOCUMENTS

| | | | |
|---|---|---|---|
| 370225 | 5/1990 | European Pat. Off. | 280/511 |
| 3008625 | 9/1981 | Germany | 280/511 |
| 93/14948 | 8/1993 | WIPO | 280/511 |

*Primary Examiner*—Brian L. Johnson
*Assistant Examiner*—Avraham H. Lerner
*Attorney, Agent, or Firm*—Lloyd W. Sadler

[57] ABSTRACT

A ball hitch coupler which provides a simplified structure for coupling a ball hitch mounted on a towing vehicle to a coupler mounted on a trailer. This invention provides an innovative single cam pin locking mechanism, which in combination with a safety pin device and a tension spring provides a strong and secure ball coupler which has a minimum of moving parts and is designed to be easily used by a user by hand.

9 Claims, 5 Drawing Sheets

U.S. PATENT DOCUMENTS

| | | | |
|---|---|---|---|
| 4,811,967 | 3/1989 | Hensley | 280/479.3 |
| 4,921,266 | 5/1990 | Beals | 280/415.1 |
| 4,940,096 | 7/1990 | Johnson | 172/443 |
| 4,944,354 | 7/1990 | Langen et al. | 172/47 |
| 4,950,010 | 8/1990 | Denny | 293/117 |
| 4,955,631 | 9/1990 | Meyer | 280/438.1 |
| 4,968,053 | 11/1990 | Schweigert | 280/460.1 |
| 4,991,864 | 2/1991 | Potsch | 280/441 |
| 5,016,898 | 5/1991 | Works et al. | 280/433 |
| 5,058,915 | 10/1991 | Burns | 280/441.2 |
| 5,085,451 | 2/1992 | Schweigert | 280/460.1 |
| 5,110,024 | 5/1992 | Rodic | 224/328 |
| 5,110,149 | 5/1992 | Dahlstrom | 280/401 |
| 5,161,815 | 11/1992 | Penor, Jr. | 280/477 |
| 5,167,423 | 12/1992 | Hall, Jr. | 280/486 |
| 5,259,223 | 11/1993 | Nee | 70/232 |
| 5,328,198 | 7/1994 | Adams | 280/439 |
| 5,332,248 | 7/1994 | Higginbotham | 280/402 |
| 5,344,173 | 9/1994 | Beeler et al. | 280/438.1 |
| 5,378,007 | 1/1995 | Joyce | 280/433 |
| 5,387,002 | 2/1995 | Grevich | 280/406.2 |
| 5,435,585 | 7/1995 | Chambers | 280/415.1 |
| 5,435,586 | 7/1995 | Smith | 280/425.2 |
| 5,472,222 | 12/1995 | Marcy | 280/433 |
| 5,501,481 | 3/1996 | Chumley et al. | 280/476.1 |
| 5,503,421 | 4/1996 | DeLisser et al. | 280/441.1 |
| 5,509,682 | 4/1996 | Lindenman et al. | 280/440 |
| 5,516,137 | 5/1996 | Kass et al. | 280/434 |
| 5,531,560 | 7/1996 | Bartholomew | 414/563 |
| 5,575,491 | 11/1996 | Fenton | 280/417.1 |
| 5,609,350 | 3/1997 | Chumley et al. | 280/476.1 |
| 5,620,198 | 4/1997 | Borchers | 280/507 |
| 5,632,501 | 5/1997 | Jackson et al. | 280/508 |
| 5,725,234 | 3/1998 | Colibert | 280/512 |

BALL HITCH COUPLER

BACKGROUND OF THE INVENTION

1. Field of the Invention

This invention relates to couplers for trailers. More specifically, this invention relates to ball-type couplers for goose neck and fifth wheel trailers which permit the positioning of the ball within the coupler while the trailer is positioned at an angle relative to the towing vehicle and which improves and simplifies the attachment between a towing vehicle having a ball hitch and a trailer having the hitch coupler of this invention. Still more specifically, this invention relates to ball hitch couplers having a single rotatable locking element for holding the ball hitch within the coupler of this invention.

2. Description of the Related Art

A variety of ball-type couplers are well known in the art to connect a towing vehicle to a trailer. A common arrangement is a generally spherical housing which is open along a bottom portion and a rear portion. The ball is positioned within the housing by sliding it upwardly through the open bottom and to a position in which the ball rests against the inside of the housing. A lever or other similar latching element which is disposed in the open rear portion is moved into a position adjacent to the ball, to thereby prevent withdrawal of the ball through the opening in the bottom. This is achieved by the lever or other latching element being moved into the area adjacent to the lower curvature of the ball. By locking the latching element in place, the ball is kept within the housing. Often such couplers requires several locking surfaces for locking the ball to the coupler, thereby complicating the coupler mechanism, decreasing its reliability, and increasing its manufacturing cost. Other coupler approaches include devices employing multiple pivotally connected control elements; sidewise dampening or braking elements; height adjustment mechanisms; U-shaped tongue hitch devices; removable hitch features; draw bars; a socket adapted for placement on the roof of the towing vehicle; a gooseneck hitch coupler; fifth-wheel hitch couplers; a shock absorbing bumper; a collar coupler, a shock absorbing trailer hitch for cushioning end thrust shocks; non-ball high clearance vehicle hitch; truck bed ball hitch assembly; up and down adjustable ball hitches; a mounting bracket for attachment to the rear bumper of a pickup truck; a plurality of ball-socket hitch couplers; a convertible hitch device which is readily adapted for attachment to the rear bumper plate of commonly used towing vehicles; a tongue for connecting the towing vehicle to the trailer; a latching assembly using manually operable gears; elongated truck trailer tongue assemblies; a trailer hitch carriage; multiple ball locking elements; trailer connecting running gear; towing system designed for use with tubular rear bumpers; hitch bar couplers; multiple links connected to ball joints; slidable locking mechanisms; elastomerized shear cushioning; hitch adapters for use with double caster wheel trailers; a coupling structure not utilizing ball and socket coupling; combined receiver trailer hitch and bumper assemblies; a three point hitch assembly; a three point coupling device; accessory mounting apparatuses; hitch having an axially extending pin for fixing the hitch; a self aligning hitch device; power operated hitch mechanisms; trailer uncoupler devices; folding ball hitch devices; and a collar for trailer hitch receivers. Each such embodiment or application has the important disadvantages of being mechanically complex both to install and to manufacture. Simplified ball couplers which provide increased strength and decreased manufacturing costs permit the ball coupler to find greater application in solving towing problems.

For general background material, the reader is directed to U.S. Pat. Nos. 3,600,004, 3,633,939, 3,655,221, 3,703,301, 3,716,255, 3,741,587, 3,756,624, 3,796,444, 3,797,685, 3,811,706, 3,837,675, 3,840,252, 3,843,161, 3,863,956, 3,900,212, 3,972,541, 3,990,722, 4,046,398, 4,088,339, 4,103,928, 4,119,328, 4,157,189, 4,168,082, 4,192,524, 4,220,350, 4,227,713, 4,240,647, 4,253,679, 4,256,323, 4,272,098, 4,361,939, 4,365,820, 4,398,743, 4,402,523, 4,420,169, 4,426,097, 4,438,944, 4,443,025, 4,560,184, 4,606,549, 4,613,149, 4,626,154, 4,664,403, 4,699,395, 4,714,264, 4,721,323, 4,738,464, 4,792,151, 4,811,967, 4,921,266, 4,940,096, 4,944,354, 4,950,010, 4,955,631, 4,968,053, 4,991,864, 5,016,898, 5,058,915, 5,085,451, 5,110,024, 5,110,149, 5,161,815, 5,167,423, 5,259,223, 5,328,198, 5,332,248, 5,344,173, 5,378,007, 5,387,002, 5,435,585, 5,435,586, 5,472,222, 5,501,481, 5,503,421, 5,509,682, 5,516,137, 5,531,560, 5,575,491, 5,609,350 and 5,620,198, each of which is hereby incorporated by reference in its entirety for the material disclosed therein.

SUMMARY OF THE INVENTION

It is desirable to provide an improved ball coupler for ball socket hitch connections between towing vehicles and trailers. Such an improved coupler should provide a secure hold on the ball hitch and should include a safety mechanism to prevent the coupler from inadvertently releasing the ball hitch. Such a coupler should also enable the user to open and close the coupler without having to physically climb onto the bed of the towing vehicle. Additionally, such a coupler should accomplish the coupling with a minimum of moving parts, which tend to fail, and with a simplified coupling structure so as to reduce the cost of manufacture and to reduce the difficulty of coupling to the ball hitch.

Accordingly, it is an object of this invention to provide a ball hitch coupler which securely locks to a ball hitch using only a single locking element.

It is another object of this invention to provide a ball hitch coupler which has a safety mechanism to prevent the coupler from inadvertently releasing the ball hitch.

It is still another object of this invention to provide a ball hitch coupler with increased strength so as to more securely hold the ball hitch.

It is a further object of this invention to provide a ball hitch coupler which may be opened and/or closed from a remote location.

It is a still further object of this invention to provide a ball hitch coupler which has a simplified mechanical structure designed to minimize coupler weight while not reducing the coupler strength.

These and other objects of this invention, which will be readily apparent to those of ordinary skill in the art upon review of the following description, drawings and claims, are achieved by the specific embodiment of the ball hitch coupler of this invention which includes a ball coupler body composed of strengthened steel and which has a ball locking cam opening, a safety lock opening, a spring lock opening, an inner wall defining a void formed to receive a ball hitch, and a weight reduction cut away; a cam pin, and a handle with a cable release opening.

DETAILED DESCRIPTION OF THE INVENTION

This invention is a ball hitch coupler which provides enhanced ease of use, lower weight, increased strength and fewer necessary moving parts than couplers in prior use. One of the important novel features of this invention is the single cam pin design which provides the means for locking the ball hitch into the coupler.

Figure 1:
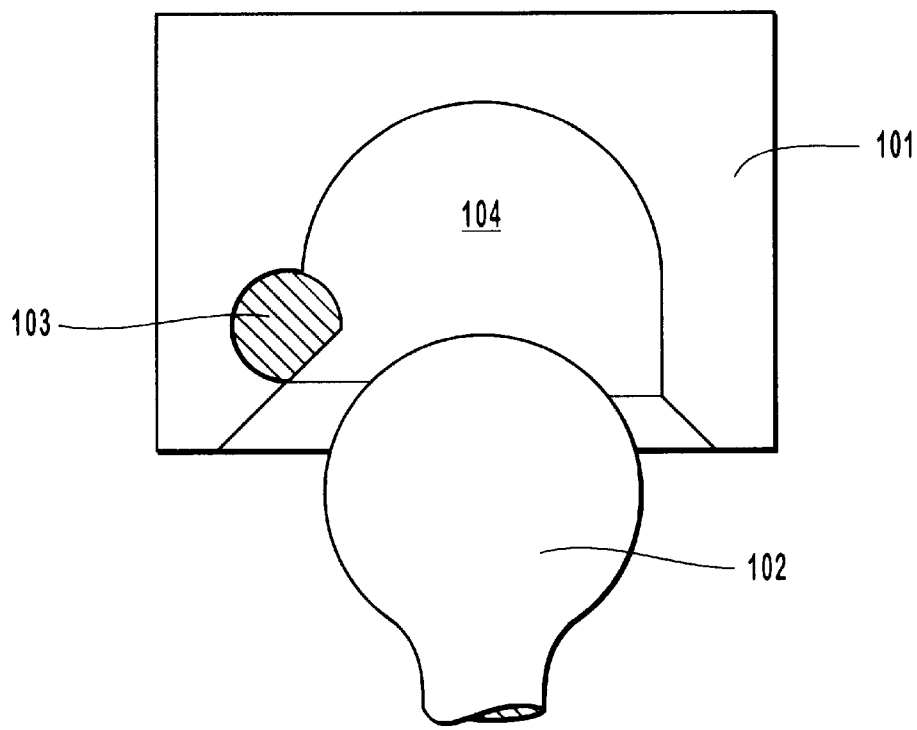
FIG. 1 shows a cross-sectional view of the coupler housing of this invention showing the preferred embodiment of the invention and a ball hitch.

FIG. 1 depicts a cross-sectional view of the coupler housing of this invention showing the preferred embodiment of the invention and a ball hitch. The coupler housing body 101 is shown in a simplified form about to receive a ball hitch 102 into the ball hitch cavity 104. A representation of the cam pin 103 is depicted in a lock position. Once the ball hitch 102 is placed into the ball hitch cavity 104 the cam pin 103 is rotated so that a portion of the cam pin 103 extends out as shown to restrain the ball hitch 102 from being released by the coupler housing 101.

Figure 2:
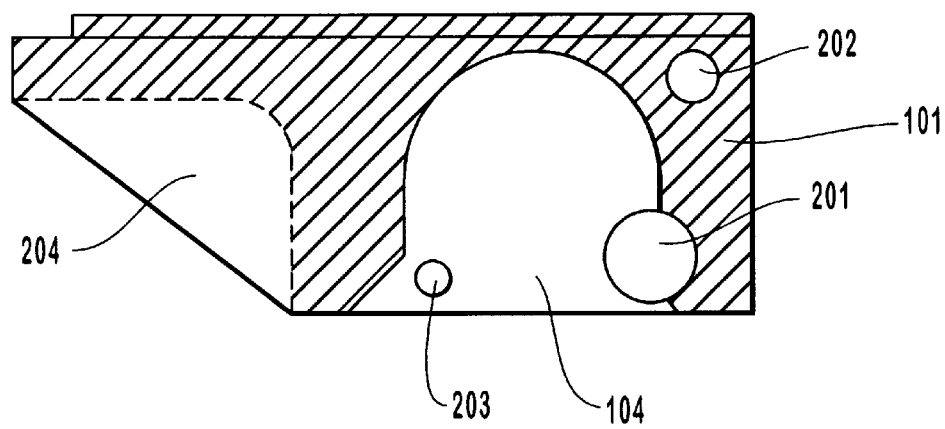
FIG. 2 shows a cross-section view of the preferred embodiment of the coupler body seen from the side.

FIG. 2 depicts a section view of the preferred embodiment of the coupler body seen from the side. The coupler housing body 101 has a cam pin opening 201 for the receipt of the can pin 103 and a safety lock opening 202 for the receipt of a safety lock pin and clip. A handle restraining screw opening 203 is provided to permit the inclusion of a spring pin. A cavity 204 is provided in the preferred embodiment of the coupler housing body 101 to reduce the weight and material cost of the coupler. The ball hitch cavity 104 is shown for the receipt of the ball hitch 102.

Figure 3:
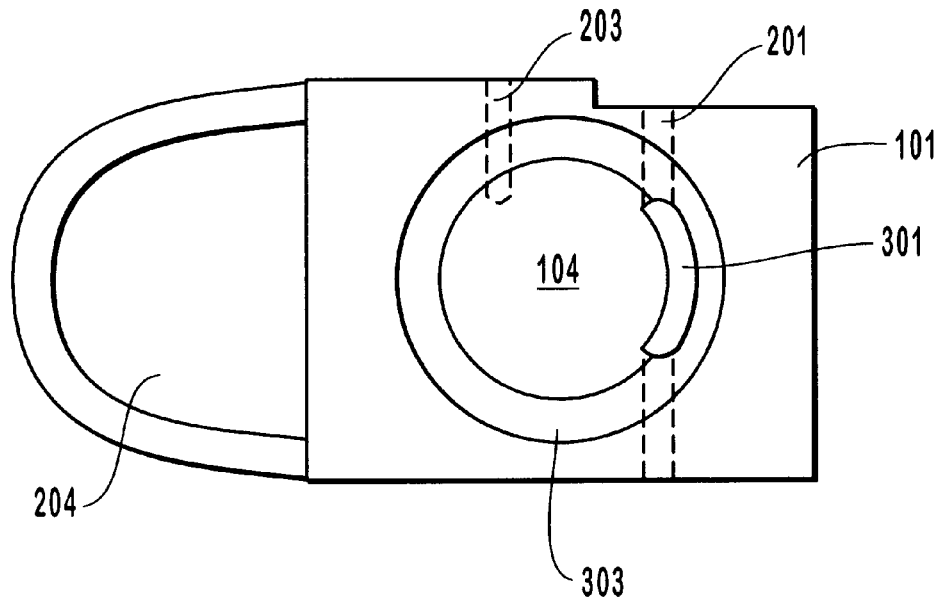
FIG. 3 shows a bottom up view of the preferred embodiment of the coupler body of the invention.

FIG. 3 depicts the bottom up view of the preferred embodiment of the coupler body of the invention. In its typical configuration the ball hitch 102 is mounted upwards on the rear of the towing vehicle. Therefore, the typical coupler 101 is mounted with the ball hitch cavity 104 directed downwards, in a manner such that it can easily mate with the ball hitch 102. This view of the coupler body shows the cam pin opening 201 as it passes through the coupler housing body 101 and the ball hitch cavity 104. Where the cam pin opening 201 intersects the ball hitch cavity 104 a recess is provided 301 for the cam pin rotation, thereby providing for the locking and unlocking of the ball hitch 102 in the coupler 101. The ball hitch cavity 104 is provided with a tapered region 303 which being tapered inwardly accommodates the receipt of the ball hitch 102. Again, the weight reduction cavity 204 is shown, as is the handle restraining screw opening 203. The preferred coupler housing body 101 is 7 inches in length, 4 inches in width, and 3 and ¼ inches in thickness. The preferred ball hitch cavity is 2 and ½ inches in diameter.

Figure 4:
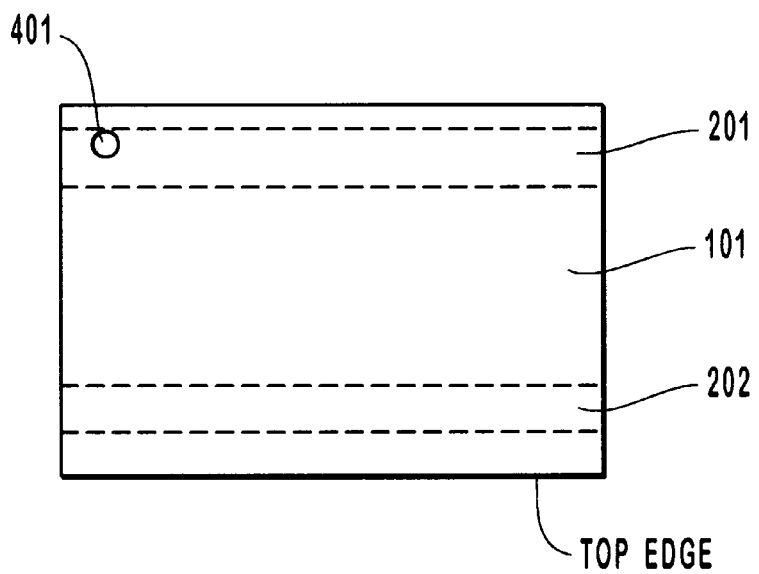
FIG. 4 shows the rear view of the preferred embodiment of the coupler body.
Figure 5A:
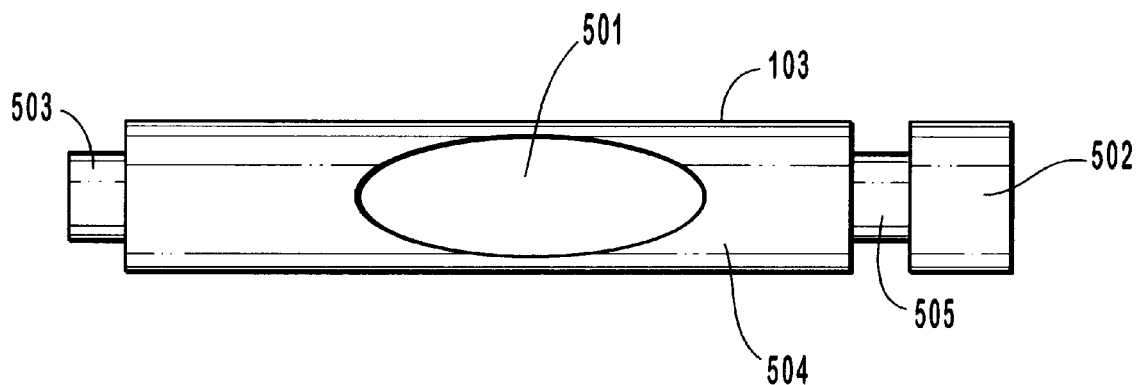
FIG. 5 shows four views of the preferred cam pin used in the invention.
Figure 5B:
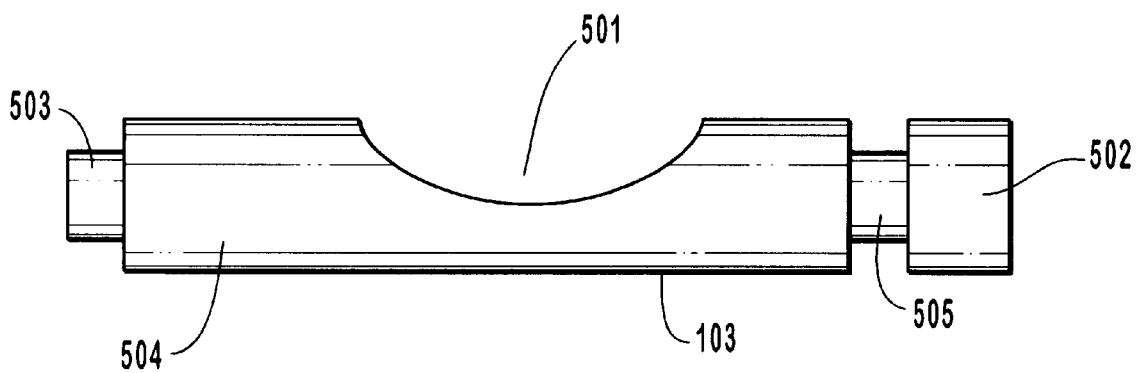
Figure 5C:
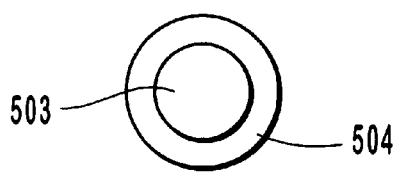
Figure 5D:
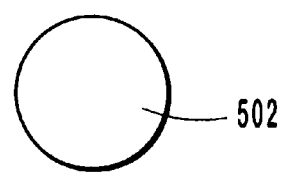

FIG. 4 depicts the rear view of the preferred embodiment of the coupler body of the invention. This view of the coupler housing body 101 shows an additional view of the cam pin opening 201 and the safety lock opening 202. A set screw opening 401 is provided for receiving a set screw used for retaining the cam pin 103. The preferred set screw opening 401 is ¼ inches in diameter.

FIG. 5 shows four views of the preferred cam pin used in the invention. FIG. 5a shows the cam pin 103 and a forward view of the ball hitch recess 501. When the ball hitch recess 501 is aligned with the interior surface of the ball hitch cavity 104 the ball hitch 102 is allowed to freely move in or our of the coupler housing body 101. When the cam pin 103 is turned such that the ball hitch recess 501 does not align with the interior of the ball hitch cavity 104, the ball hitch 102 is constrained from moving either in or out of the coupler housing body 101, by the protruding surface 504 of the cam pin 103. A handle attachment 503 is provided for connecting to the handle 601. A retainer groove 505 is provided to interact with the set screw which is placed in the set screw opening 401. With the set screw in place, through the set screw opening 401 and extending into the cam pin 103 retainer groove 505, the cam pin 103 is held in place within the coupler housing body 104. A head portion 502 is provided to cooperate with the retainer groove 505 for holding the cam pin 103 in place. FIG. 5b shows a side view of the cam pin 103. FIG. 5c shows the end view detail of the handle attachment 503 of the cam pin 103. The head portion 502 end is shown in detail in FIG. 5d. The preferred cam pin 103 is ¾ of an inch in diameter and 4.135 inches in length. The ball hitch recess 501 is approximately 1.645 inches in length. And the retainer groove 505 is ¼ inch in width.

Figure 6A:
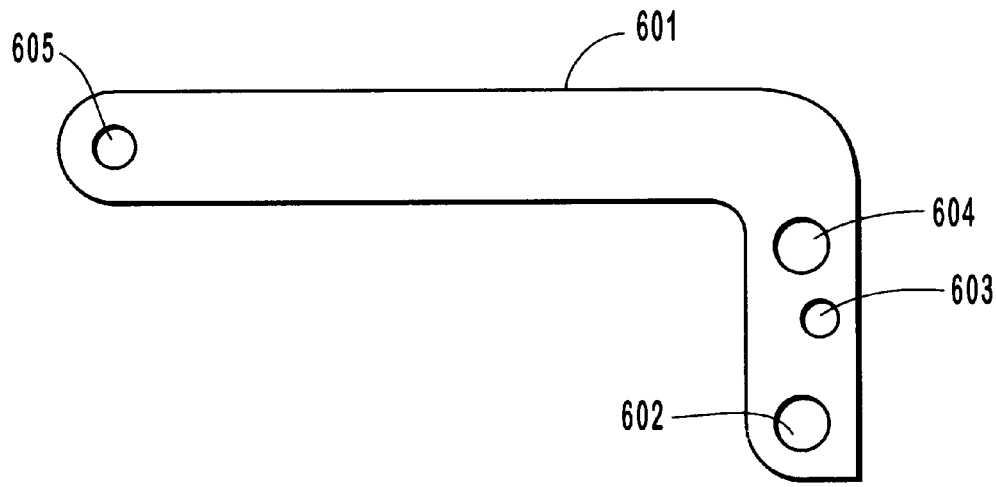
FIG. 6 shows three view of the preferred handle used in the invention.
Figure 6B:
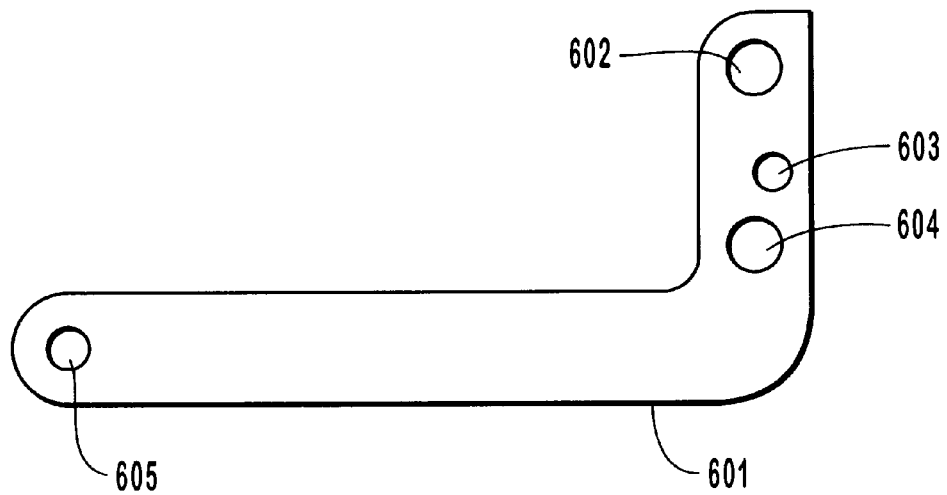
Figure 6C:
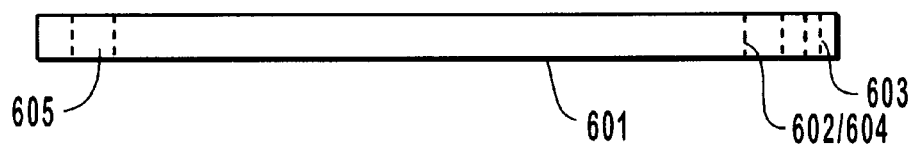

FIGS. 6a, 6b, and 6c show three views of the preferred handle used in the invention. The handle 601 is provided to give the user the capability of opening or closing the cam pin 103 to release or restrain the ball hitch 102. Openings are provided to permit the handle to be attached to the cam pin 103, the cam pin handle opening 602, the safety lock pin, the safety lock pin opening 604, a spring screw, the spring screw opening 603, and a remote release cable, the cable release opening 605. In the current preferred embodiment of the invention the handle 601 is generally "L" shaped with the long leg 5 inches long and the short leg 3 inches long. The handle 601 is 1 and ¼ inches wide and ¼ inch thick. The cam pin handle opening 602 is ½ inch in diameter. The safety lock pin opening 604 is approximately ½ inch in diameter. The spring screw opening 603 is approximately 0.25 inches in diameter. The cable release opening 605 is approximately ¼ inch in diameter.

Figure 7:
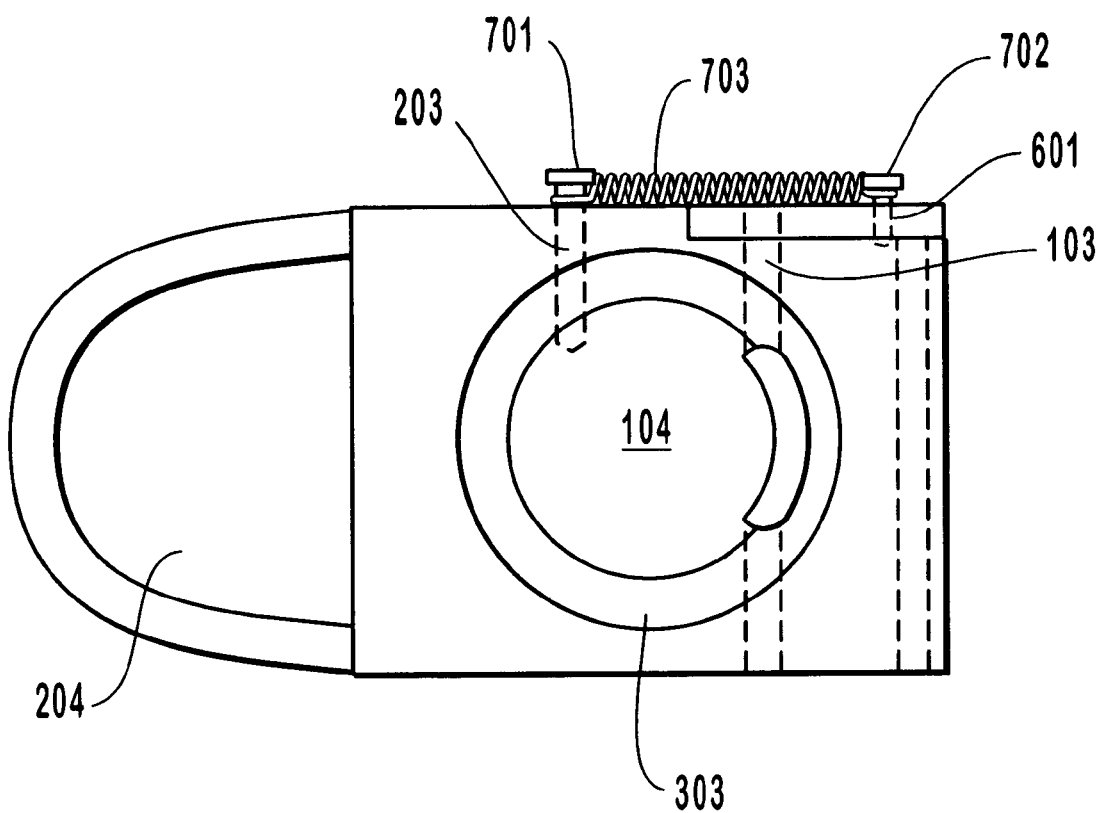
FIG. 7 shows the preferred coupler of the invention full assembled.

FIG. 7 shows the preferred coupler of the invention full assembled. In this view the handle 601 is shown connected to the cam pin 103, which in turn is inserted into the cam pin opening 201 and is turned to restrain a ball hitch from entering the ball hitch cavity 104. A restraining screw 701 is shown inserted in the restraining screw opening 203. A spring 703 is provided to give tension to the handle 601 by being connected to the restraining screw 701 and the spring screw 702 which is inserted in the spring screw opening 603.

In the preferred embodiment of the invention all components are composed of steel, cast steel for the coupler housing body 101, plate steel for the handle 601, and polished steel for the cam pin 103.

It is to be understood that the above described embodiments are merely illustrative of numerous and varied other embodiments which may constitute applications of the principles of the invention. Such other embodiments may be readily devised by those skilled in the art without departing from the spirit or scope of this invention, and it is the inventors' intent that such other embodiments be deemed within the scope of this invention.

We claim:

1. A ball hitch coupler, comprising:
   (A) a hitch coupler body, further comprising a ball hitch cavity having an interior surface;
   (B) a cam pin inserted in said hitch coupler body said cam pin further comprising a ball hitch recess and a protruding surface, and wherein said ball hitch recess can be aligned with said interior surface of said ball hitch cavity to permit a ball hitch to move freely in and out of said ball hitch cavity, and wherein said protruding surface of said cam pin can be aligned to protrude into said ball hitch cavity thereby physically constraining the movement of a ball on said ball hitch;
   (C) a handle attached to said coupler pin to permit the user to turn said cam pin thereby opening or closing the coupler;
   (D) a safety opening for receiving a safety pin and thereby for holding said handle in a fixed position;
   (E) a handle tension spring attached to said handle and to said hitch coupler body to provide tension against the movement of said handle; and
   (F) a restraining screw inserted in said hitch coupler body and extending through said interior surface of said ball hitch cavity to restrain movement of the ball on said ball hitch.

2. A ball hitch coupler, as recited in claim 1, wherein said hitch coupler body further comprises an inwardly tapered ball hitch cavity opening.

3. A ball hitch coupler, as recited in claim 1, wherein said cam pin further comprises a recess for passing a ball hitch.

4. A ball hitch coupler, as recited in claim 1, wherein said cam pin further comprises a groove for use in restraining said cam pin in said hitch coupler body.

5. A ball hitch coupler, as recited in claim 1, wherein said cam pin further comprises an end adapted to be attached to said handle.

6. A ball hitch coupler, as recited in claim 1, wherein said safety opening is adapted to receive a pin and clip device for locking said handle in place.

7. A ball hitch coupler, as recited in claim 1, wherein said hitch coupler body further comprises a weight reduction cavity for reducing the weight of said hitch coupler body.

8. A ball hitch coupler as recited in claim 1, wherein said hitch coupler body is composed of cast steel.

9. A ball hitch coupler, comprising:
   (A) a hitch coupler body adapted to receive a standard ball hitch;
   (B) a single cam pin for restraining said standard ball hitch wherein said cam pin further comprises a ball hitch recess and a protruding surface and wherein said protruding surface is adapted to be in physical contact with a ball on said standard ball hitch to constrain the movement of said standard ball hitch;
   (C) a handle adapted to mount to said single cam pin and to be held to said hitch coupler body; and
   (D) a restraining screw extending through said hitch coupler body, into said ball hitch recess to provide a further restraint to the ball on said standard ball hitch.

* * * * *